W. H. UNDERWOOD.
METAL HAIR.
APPLICATION FILED NOV. 22, 1917.
1,355,368.
Patented Oct. 12, 1920.
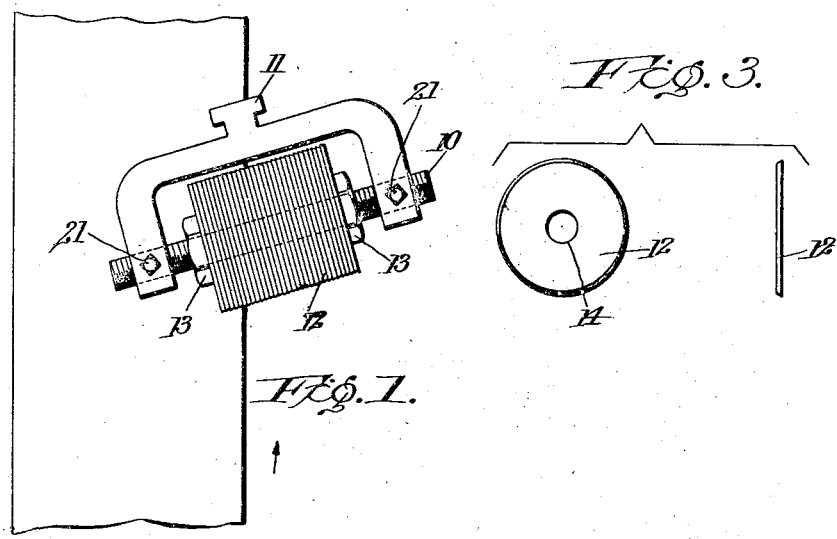
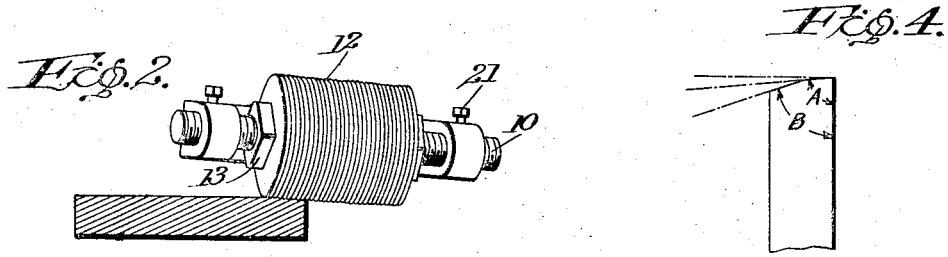
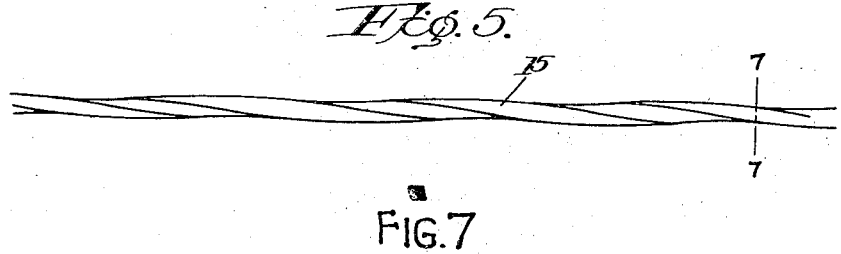
FIG. 7
Inventor
Walter H. Underwood
Attorney

UNITED STATES PATENT OFFICE.

WALTER H. UNDERWOOD, OF NEW YORK, N. Y.

METAL HAIR.

1,355,368.  Specification of Letters Patent.  Patented Oct. 12, 1920.

Original application filed March 20, 1917, Serial No. 156,095. Divided and this application filed November 22, 1917. Serial No. 203,470.

*To all whom it may concern:*

Be it known that I, WALTER H. UNDERWOOD, a citizen of the United States, and residing at New York, New York county, State of New York, have invented certain new and useful Improvements in Metal Hair, of which the following is a specification.

The present invention relates to a metal hair or filament as an article of manufacture, this application being a division of my application 156,095, filed March 20, 1917.

My new and novel hair or filament is smooth, of fine gage, uniform size and has a slight twist about its longitudinal axis. Its characteristics, one method of producing the same and novel features will be apparent from the following description taken in connection with the drawings in which:

Figure 1 is a diagrammatic plan view showing the relation of the stock and tool as arranged in a planer or similar machine tool, this being one method of producing the filaments;

Fig. 2 is a front elevation of the parts shown in Fig. 1, the stock being shown in section;

Fig. 3 illustrates in side and end elevation one of the circular plates which is used in the tool shown in Fig. 1 and Fig. 2;

Fig. 4 is a view to a larger scale showing the cutting edge of the plates used in the tool;

Fig. 5 is a greatly magnified view of a short length of the new hair or filament of my invention;

Fig. 6 is a view illustrating a small bundle of the hair or filaments;

Fig. 7 is a cross-sectional elevation of one form of hair or filament taken substantially on the line 7—7 of Fig. 6.

My new product may be made from various metals and alloys, such as steel, lead and brass, ductility being an important quality of the material used. The filaments may be produced by being cut from either a flat or round bar stock on a planer, lathe, or similar machine tool which is adapted for fine work, by a skew or plow cut. The tool used has almost a square cutting edge, the angle between the surfaces being approximately 90°.

Referring to Figs. 1, 2 and 3, an arrangement and tool are shown for cutting filaments in a planer from flat bar stock. The tool comprises a mandrel 10, the ends of which are adapted to be mounted in a suitable holder 11 and which carries a series of thin plates or disks 12. Any desired number of these plates or disks 12 may be mounted on the mandrel and securely clamped in position thereon by the nuts 13, threaded on the mandrel. The disks 12 are made from flat stock $\frac{1}{32}$ of an inch or more in thickness, and are formed with cutting edges at the peripheries. As shown in Fig. 4, this cutting edge is made by beveling off the cylindrical surface of the disk for about one-third of its width so that the angle between the side of the disk and its peripheral surface is almost 90°, preferably about 87°, as shown at A. The remainder of the edge of the disk makes an angle of about 75° to provide clearance for the filament as shown at B. These disks are formed with bores 14 for mounting the same on the mandrel 10. Thus the tool is formed by assembling a plurality of the disks on the mandrel 10. In setting up the work and tool in the planer the holder is mounted in the same so that the disks or plates 12 make an acute angle with the direction of movement of the stock. As shown in Fig. 1, the disks are mounted so that their cutting edges are at the left. Thus as the stock moves in the direction indicated by the arrow, the lower part of the peripheries of the disks will each cut off a filament of the metal with a skew cut. The size of the hairs or filaments is controlled in one direction by the depth of the cut and in the other direction by the feed of the tool. The filaments produced in this or a similar manner have a twist about their longitudinal axes, this twist being due to the way in which the filaments are cut. The small segment of each disk which acts to cut off the filaments evidently turns the same over in a manner similar to the action of a disk plow. I have found that setting the disks at a greater or less angle to the line of movement of the stock gives the filaments more or less twist depending upon the degree of said angle.

The mandrel 10 may be mounted in the holder 11 so that, as one portion of the cutting edge of the disks becomes dull, it may be turned whereby the disks will present fresh and sharp cutting edges. The mandrel may be held against rotation by any suitable means, such as set screws 21.

Referring to Fig. 2 it will be noted that the mandrel is inclined, the right hand end of the same being lower than the left, as viewed in this figure. The amount of this inclination may be varied to suit conditions, such as the kind of stock used and the size of the filaments desired. Thus if filaments 1/1000 of an inch thick be desired and 20 disks be in the tool, the difference in elevation between the left disk and right disk would be about 20/1000 of an inch. The tool is fed to the left as viewed in Fig. 2 after each cut, in the usual way, an amount equal to the width of the filament desired. Thus the left disk of Fig. 2 will make the first cut. After this cut the tool will be fed to the left the width of one filament and on the second cut the left hand disk will produce another filament, and the second disk being 1/1000 of an inch lower than the left disk will make a cut on the surface left by the first cut of the first disk. It will be seen, therefore, that the disks successively operate on the surfaces left by the preceding cuts. The holder 11 is mounted in the planer so that the mandrel can be adjusted to any position, as above described.

As shown in Fig. 5, my filament 15 is of uniform size, has sharp longitudinally extending edges and a slight twist about its longitudinal axis, the finest filament for practical use having a cross section of about 0.0005"x0.0005", but that substantially 0.001"x0.002" being more generally useful. Although Fig. 7 shows a cross-sectional elevation of a filament or hair of this invention it is to be distinctly understood that the filaments are not limited to a cross-section such as shown. This view is included in the drawings solely for the purpose of indicating that the longitudinal edges of the filaments or hair are sharp.

The filaments produced as described are a new product, being smooth, strong, of great length, of fine and uniform size, and twisted as desired about their longitudinal axes. They are very different from the filaments constituting the product known as metal wool. The filaments of this latter product are curled, are not uniform in size, have rough, jagged edges and only a fraction of the strength of the filaments of this invention and are not of as fine a gage.

Furthermore, in addition to its many desirable properties, the present filament costs only a fraction of the kind heretofore known, and the field for its use is much greater, as it is desirable in many products where metal wool cannot be used, for example, fine fiber brushes.

Again, because of its smoothness, strength, uniform size and length, the filament is particularly desirable in spinning metal yarn and weaving into metal fabrics. The jagged, short, curled metal fibers heretofore used required special treatment and special machinery in spinning and weaving, because of the jagged edges, etc. As the present filament has none of these defects, the processes of spinning and weaving the same are simpler, and hence less expensive. Moreover the yarn and fabric produced are better and more satisfactory.

As an abrasive or polishing agent it acts entirely differently from the commercial metal wool, heretofore used. The latter polishes by scratching with its serrated edges, whereas the present product because of its sharp smooth edges shaves off the high points of the surface which is being polished. Hence a better polish is obtained with my filaments.

In appearance, a mass of my filaments can scarcely be distinguished from human hair. Indeed, a bundle of my steel filaments appears exactly like steel gray hair. For this reason my product may be termed metal hair as distinguished from the old curly product known as metal wool.

For other methods and apparatus for producing my novel filaments reference may be had to the application referred to above.

Having thus described the invention what is claimed as new and desired to be secured by Letters Patent is:—

1. As an article of manufacture, a metal filament of fine gage, uniform size and having a twist about its longitudinal axis.

2. As an article of manufacture a metal filament or hair having a twist about its longitudinal axis.

3. As an article of manufacture, a metal filament or hair having a substantially uniform twist about its longitudinal axis.

4. As an article of manufacture a cut-from-metal-stock filament or hair of fine gage having sharp longitudinally extending edges.

5. As an article of manufacture a cut-from-metal-stock filament or hair of fine gage having sharp longitudinally extending edges and a slight twist.

6. As an article of manufacture a cut-from-metal-stock filament or hair of fine gage, uniform size, smooth sharp edges and having considerable tensional strength.

In testimony whereof I affix my signature.

WALTER H. UNDERWOOD.